US010330114B2

(12) United States Patent
Hsiao

(10) Patent No.: US 10,330,114 B2
(45) Date of Patent: Jun. 25, 2019

(54) DRAINAGE DEVICE COVER FOR AIR ACCESS

(71) Applicant: HOLIMAY CORPORATION, Bade, Taoyuan County (TW)

(72) Inventor: Yu-Ming Hsiao, Bade (TW)

(73) Assignee: Holimay Corporation, Bade, Taoyuan County (TW)

( * ) Notice: Subject to any disclaimer, the term of this patent is extended or adjusted under 35 U.S.C. 154(b) by 245 days.

(21) Appl. No.: 15/610,868

(22) Filed: Jun. 1, 2017

(65) Prior Publication Data

US 2017/0350415 A1    Dec. 7, 2017

(30) Foreign Application Priority Data

Jun. 3, 2016 (TW) .............................. 105117547 A

(51) Int. Cl.
| F04D 29/40 | (2006.01) |
| F04D 29/42 | (2006.01) |
| F04D 29/44 | (2006.01) |
| F04D 13/06 | (2006.01) |
| F04D 29/58 | (2006.01) |
| F04D 29/70 | (2006.01) |
| H02N 2/12  | (2006.01) |

(52) U.S. Cl.
CPC ......... F04D 29/4246 (2013.01); F04D 13/06 (2013.01); F04D 29/441 (2013.01); F04D 29/5806 (2013.01); F04D 29/703 (2013.01); F04D 29/4226 (2013.01); F05D 2260/607 (2013.01); H02N 2/12 (2013.01); Y02T 50/675 (2013.01)

(58) Field of Classification Search
CPC .... F04D 29/4246; F04D 13/06; F04D 29/441; F04D 29/703
See application file for complete search history.

(56) References Cited

U.S. PATENT DOCUMENTS

| 6,322,326 | B1 * | 11/2001 | Davis ...................... F04D 13/08 |
| | | | 417/279 |
| 7,252,482 | B2 * | 8/2007 | Walker ................... F04D 13/06 |
| | | | 310/63 |
| 2015/0275919 | A1 * | 10/2015 | Hsiao .................... F04D 29/582 |
| | | | 415/115 |

FOREIGN PATENT DOCUMENTS

TW           M308567 U        3/2007

* cited by examiner

*Primary Examiner* — Kevin A Lathers
(74) *Attorney, Agent, or Firm* — Muncy, Geissler, Olds & Lowe, P.C.

(57) ABSTRACT

A drainage device includes a cover body formed of a top and a cylindrical body portion, an opening defined in a bottom side of said cylindrical body portion of said over body, air outlets located in a top side of the cylindrical body portion, a shoulder extended around a middle part of the cylindrical body portion, an outer wall downwardly extended from the shoulder around the cylindrical body portion, and air inlets located on the outer wall. The drainage device cover is mounted on a mounting plate of a drainage device and covered over a motor such that the cylindrical body portion has the bottom edge thereof isolated from the mounting plate, the air outlets face toward the exhaust fan of the motor, and the bottom edge of the outer wall is abutted against the top surface of the mounting plate.

7 Claims, 5 Drawing Sheets

US 10,330,114 B2

DRAINAGE DEVICE COVER FOR AIR ACCESS

BACKGROUND OF THE INVENTION

1. Field of the Invention

The present invention relates to drainage device technology and more particularly, to a drainage device cover for air access.

2. Description of the Related Art

Taiwan patent M308567 discloses a motor cover used in a drainage device for shielding a motor to guide the flowing of air during rotation of the exhaust fan of the motor. Since this design of motor cover is configured to cover the motor and other component parts of the drainage device, it has a large overall volume. Due to the use of this large size motor cover, the overall space usage and arrangement for the various component parts of the drainage device is limited, so the volume of the motor cover should have to be reduced.

Further, the aforesaid prior art motor cover comprises a plurality of air inlets located on one slope surface thereof. This slope surface is adapted for covering other component parts of the drainage device. As the drainage device may be used in a more dirty environment having dust and debris, the air flow induced during rotation of the motor can cause dust and debris to fly in the air, so that dust and debris can be carried by the induced air flow through the air inlets to the inside of the drainage device and then covered over the component parts of the drainage device, causing damage to component parts.

The inventors of the present invention has considered that if the motor cover simply covers the motor, the volume of the motor cover can be reduced. However, if the air inlets are provided on the lateral side of the motor cover as described above, dust and debris can be sucked back to the blades of the exhaust fan, and then adhered to the blades of the exhaust fan, leading to the problem of poor exhaust and motor overheat failure.

SUMMARY OF THE INVENTION

The present invention has been accomplished under the circumstances in view. It is the main object of the present invention to provide a drainage device cover for air access, which is adapted for covering the motor of a drainage device to protect the exhaust fan of the fan motor against dust and fluff.

To achieve this and other objects of the present invention, a drainage device cover for adapted for mounting at a drainage device that comprises a mounting plate, a motor mounted at a top surface of the mounting plate and an exhaust fan connected to an output shaft of the motor. The drainage device cover comprises a cover body formed of a top and a cylindrical body portion, an opening defined in a bottom side of the cylindrical body portion of the over body, a plurality of air outlets located in a top side of the cylindrical body portion, a shoulder extended around a middle part of the periphery of the cylindrical body portion and facing downward, an outer wall downwardly extended from the shoulder and spaced around the periphery of the cylindrical body portion with a predetermined gap defined between the outer wall and the cylindrical body portion, a plurality of air inlets located on the outer wall, and a plurality of mounting lugs outwardly extended from a bottom edge of the outer wall below the elevation of the cylindrical body portion. The drainage device cover is mounted on the mounting plate of the drainage device and covered over the motor with the mounting lugs fastened to the mounting plate such that the cylindrical body portion has a bottom edge thereof isolated from the mounting plate, the air outlets face toward the exhaust fan, and the bottom edge of the outer wall is abutted against the top surface of the mounting plate.

Thus, the drainage device cover of the present invention simply covers the motor to protect the exhaust fan against dust and fluff. When compared to conventional designs, the overall volume of the drainage device cover is significantly reduced. Further, the invention allows suction air to flow through the air inlets and the gap beneath the cylindrical body portion into the inside of the drainage device cover, preventing the motor from being heavily covered by dust.

Other advantages and features of the present invention will be fully understood by reference to the following specification in conjunction with the accompanying drawings, in which like reference signs denote like components of structure.

DETAILED DESCRIPTION OF THE INVENTION

Figure 1:
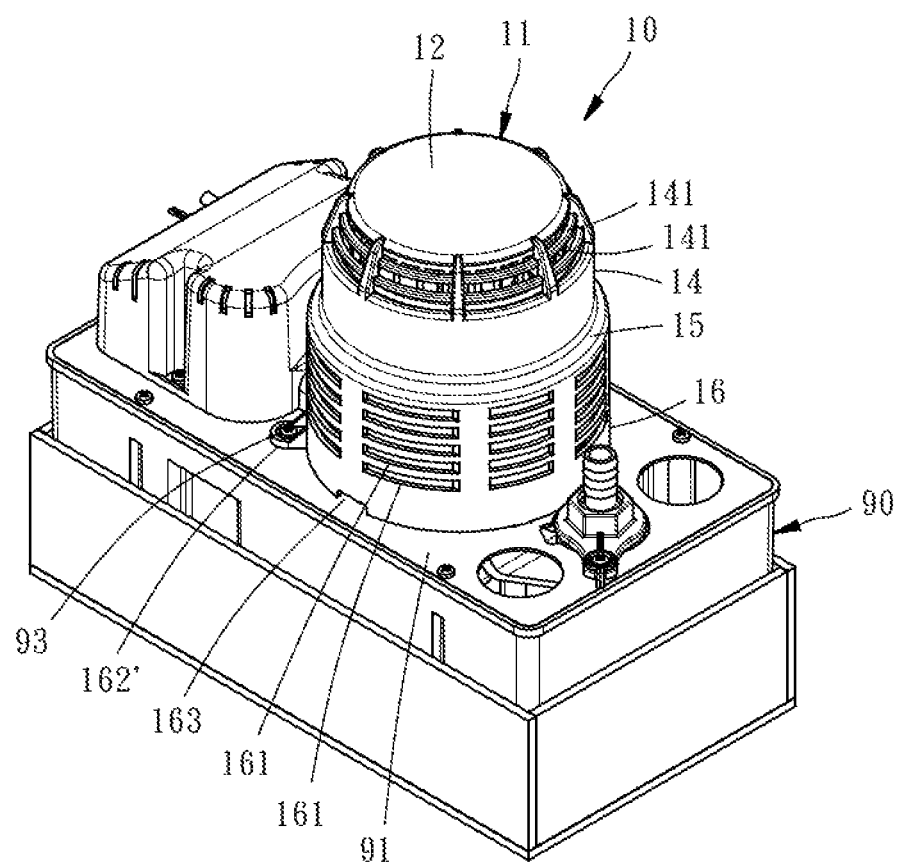
FIG. 1 is an oblique top elevational view illustrating a drainage device cover mounted at a drainage device in accordance with the present invention.
Figure 2:
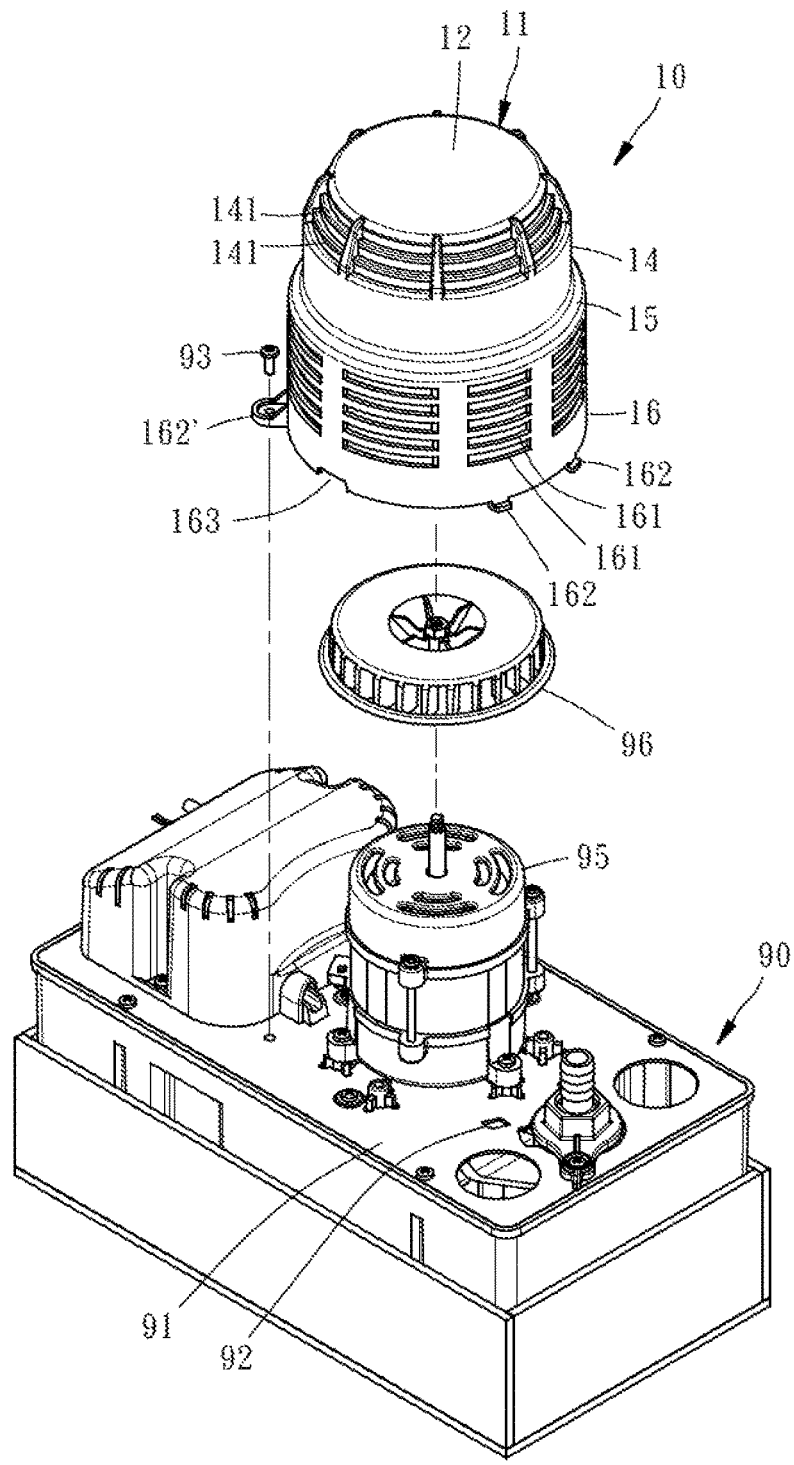
FIG. 2 is an exploded view of FIG. 1.
Figure 3:
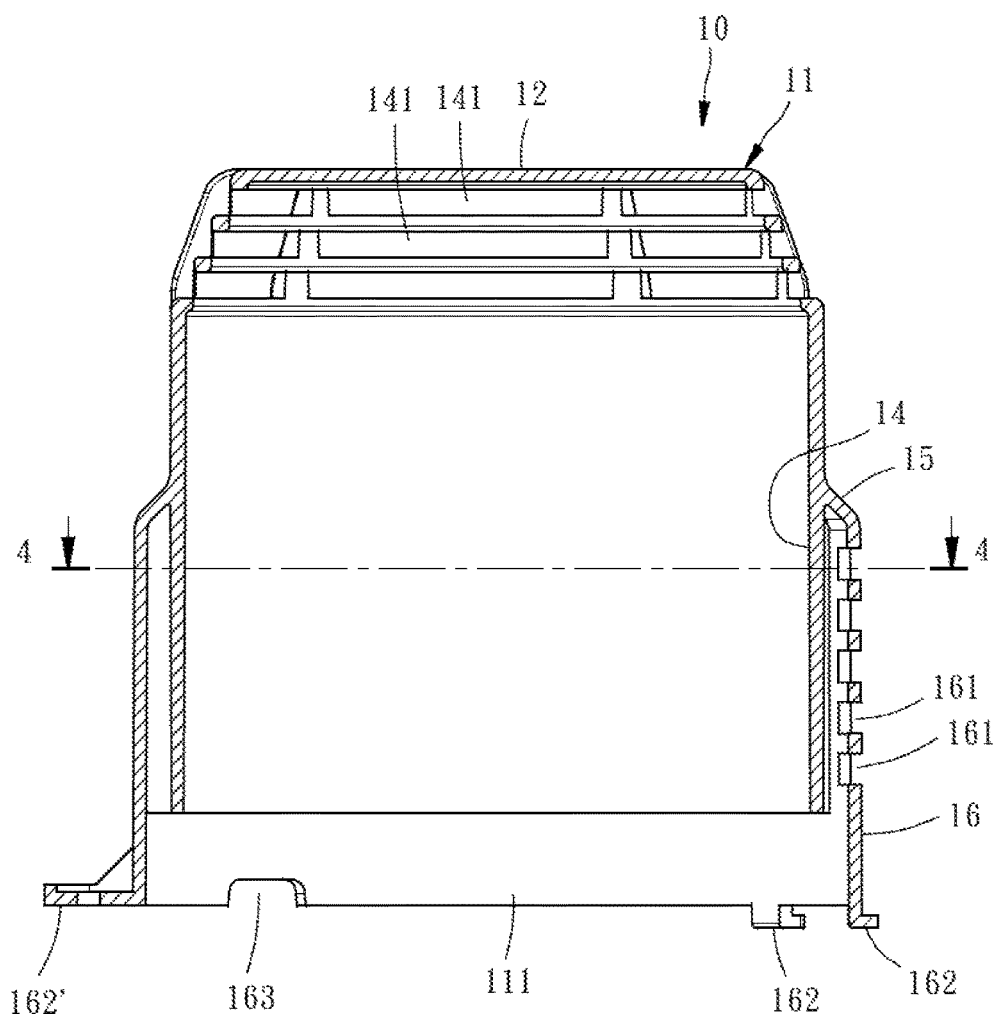
FIG. 3 is a longitudinal sectional view of the drainage device cover in accordance with the present invention.
Figure 4:
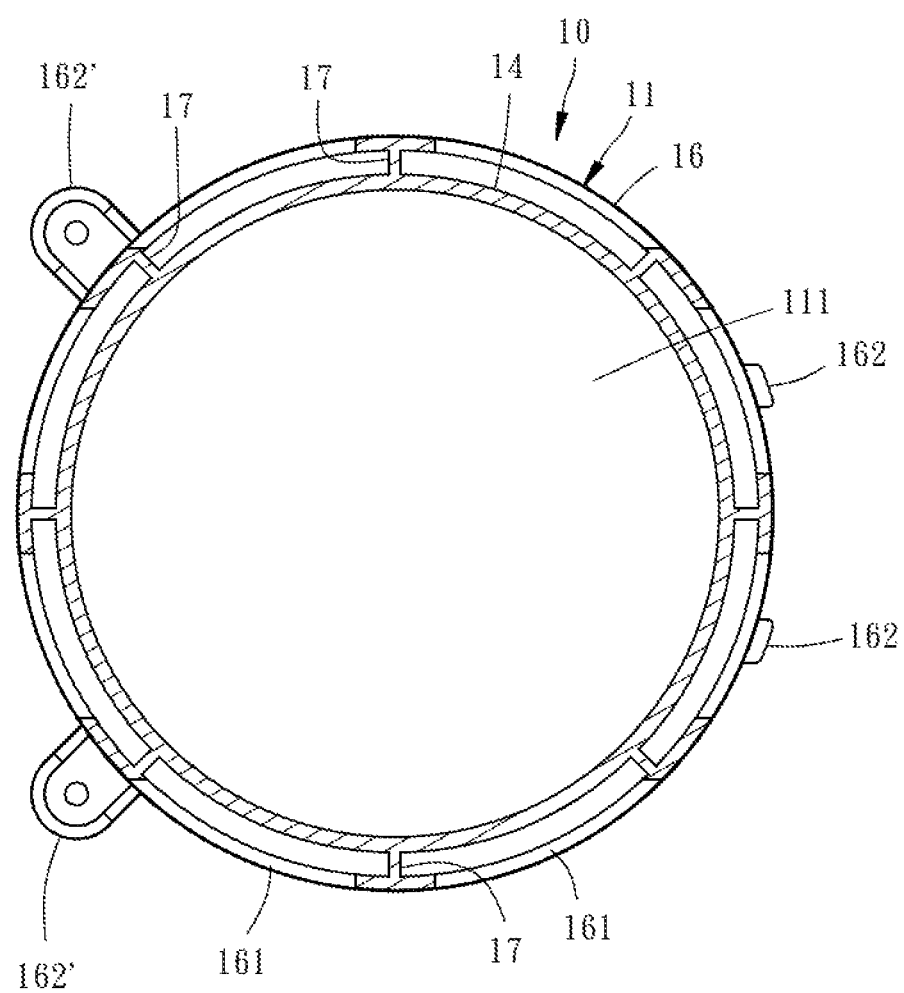
FIG. 4 is a sectional view taken along line 4-4 of FIG. 3.

Referring to FIGS. 1-5, a drainage device cover 10 for gas inlet and outlet in accordance with the present invention is shown. The drainage device cover 10 is configured for use in a drainage device 90. The drainage device 90 comprises a mounting plate 91, a motor 25 mounted on a top surface of the mounting plate 91, and an exhaust fan 96 mounted at a top side of the motor 95 and coupled to the output shaft of the motor 95.

The drainage device cover 10 comprises a cover body 11 formed of a top 12 and a cylindrical body portion 14, an opening 111 defined in a bottom side of the cylindrical body portion 14 of the over body 11, a plurality of air outlets 141 located in a top side of the cylindrical body portion 14, a shoulder 15 extended around a middle part of the periphery of the cylindrical body portion 14 and facing downward, an outer wall 16 downwardly extended from the shoulder 15 and spaced around the periphery of the cylindrical body portion 14 with a predetermined gap defined between the outer wall 16 and the cylindrical body portion 14, a plurality of air inlets 161 located on the outer wall 16, and a plurality of mounting lugs 162,162' outwardly extended from a bottom edge of the outer wall 16 below the elevation of the cylindrical body portion 14.

The drainage device cover 10 is mounted on the mounting plate 91 of the drainage device 90 with the mounting lugs 162,162', and covered over the motor 95. After mounting, the bottom edge of the cylindrical body portion 14 is isolated from the mounting plate 91, the air outlets 141 face toward the exhaust fan 96, and the bottom edge of the outer wall 16 is abutted against the mounting plate 91.

In this embodiment, the mounting lugs, referenced by 162 are hook-shaped. The mounting plate 91 comprises a plurality of hook holes 92. The hook-shaped mounting lug 162 are respectively hooked in the respective hook holes 92. The other mounting lugs, referenced by 162' are fastened to the mounting plate 91 with screws 93. By means of the aforesaid measure, the drainage device cover 10 is fastened to the mounting plate 91.

Further, in the present preferred embodiment, a plurality of ribs 17 are connected between the outer wall 16 and the cylindrical body portion 14. These ribs 17 extend downwardly from the shoulder 15 to the bottom edge of the cylindrical body portion 14. The arrangement of the ribs 17 greatly reinforce the structural strength between the outer wall 16 and the cylindrical body portion 14. In actual application, the ribs 17 can be integrally formed with the cylindrical body portion 14 and the outer wall 16 in one piece to achieve better connection effect. It is to be understood that the arrangement of the ribs 17 is not imperative, however, the overall structural strength will be relatively lowered without the arrangement of the ribs 17.

In the present preferred embodiment, the outer wall 16 further comprises at least one notch 163 located on the bottom edge thereof for use as a peep hole. In maintenance, the user can see the status inside the drainage device cover 10 from the outside through the at least one notch 163 and the space beneath the cylindrical body portion 14. In the present preferred embodiment, multiple notches 163 are provided. However, these notches 163 can be omitted. In this case, the user must detach the drainage device cover 10 so that the drainage device 90 can be seen. Further, these notches 163 provide passages for air.

After understanding of the architecture of the present invention, the functioning of the drainage device cover 10 is outlined hereinafter.

Figure 5:
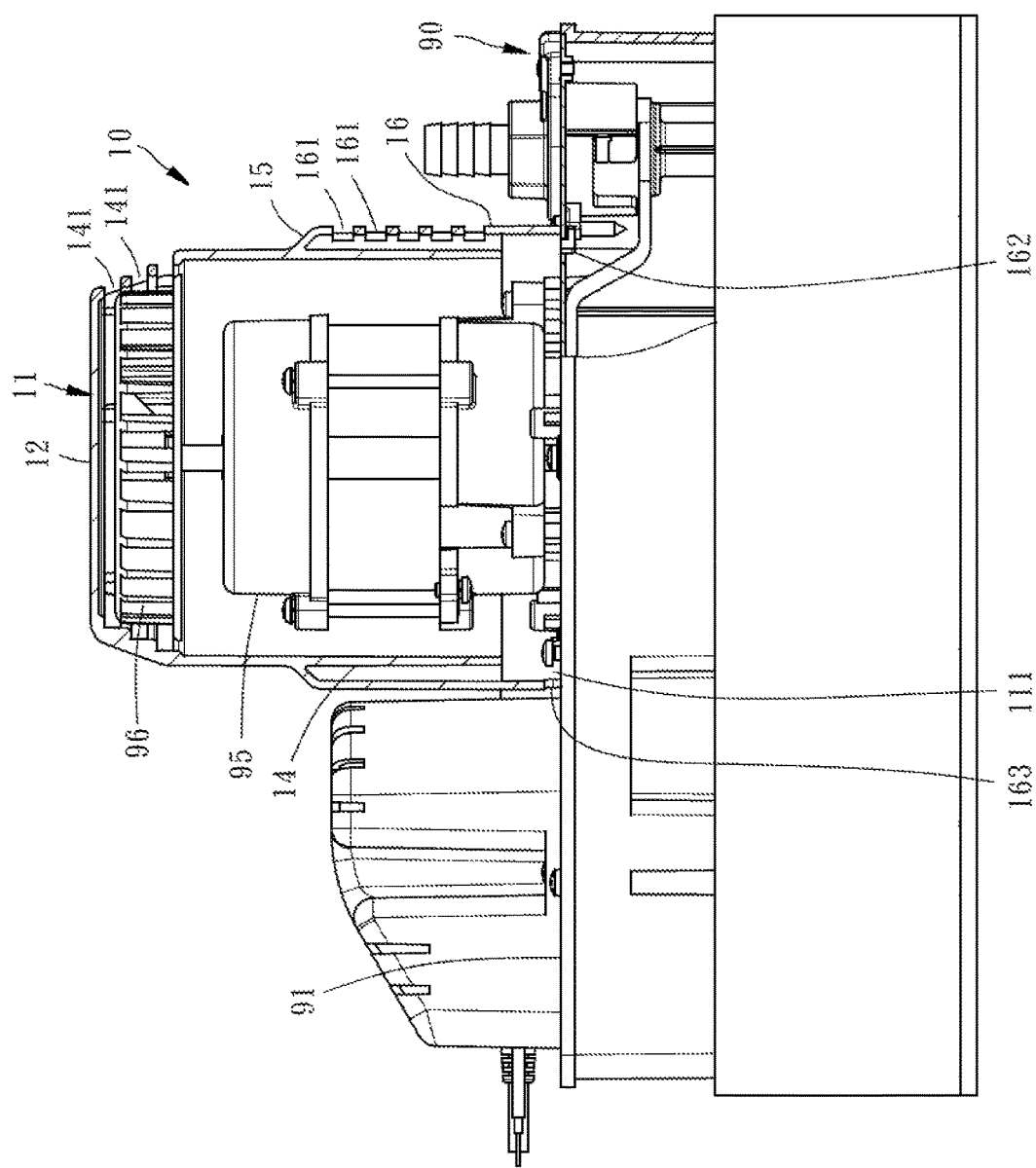
FIG. 5 is a schematic installed view, illustrating the positioning of the drainage device cover on the drainage device.

Referring to FIG. 5, during operation of the motor 95, the exhaust fan 96 is driven to rotate, causing air to be forced out of the drainage device cover 10 through the air outlets 141 to lower the air pressure inside the drainage device cover 10. When the internal air pressure of the drainage device cover 10 is lowered below the atmosphere pressure, outside air is sucked into the inside of the drainage device cover 10 through the air inlets 161 and the gap between the bottom edge of the cylindrical body portion 14 and the mounting plate 91 and the opening 111 in a bottom side of the cylindrical body portion 14 of the over body 11, i.e., outside air can enter the inside of the drainage device cover 10 through the gap beneath the cylindrical body portion 14. Because the intake air enters the inside of the drainage device cover 10 through the gap beneath the cylindrical body portion 14, dust or fluff carried in the intake air will not float to the elevation of the exhaust fan 96. It will thus be appreciated that such a design may leave most of the dust or fluff beneath the motor 95, preventing the motor 95 from being heavily covered by dust, so that the overall tolerance of the drainage device 90 to dirty environment is more improved. Further, in actual operation, a small amount of external air is also introduced into the drainage device cover 10 through the notches 163, but since the notches 163 are provided at the bottom edge of the outer wall 16, it is equivalent to making the outside air to enter the inside of the drainage device cover 10 through the gap beneath the cylindrical body portion 14, and therefore it does not affect the function of the air inlets 161.

It's worth mentioning that in the present preferred embodiment, the air inlets 161 are elongated holes arranged in an array like a to provide the effect of a filter netting for removing larger pieces of wool or debris, maintaining the inside of the drainage device cover 10 clean.

It can be seen from the above that the drainage device cover 10 of the present invention simply covers the motor 95 to protect the exhaust fan 96 against dust and fluff, and is superior to conventional techniques in protection against environmental pollution.

What is claimed is:

1. A drainage device cover for mounting at a drainage device, the drainage device comprising a mounting plate, a motor mounted at a top surface of said mounting plate and an exhaust fan connected to an output shaft of said motor, the drainage device cover including:
    a cover body formed of a top and a cylindrical body portion, an opening defined in a bottom side of said cylindrical body portion of said over body, a plurality of air outlets located in a top side of said cylindrical body portion, a shoulder extended around a middle part of the periphery of said cylindrical body portion and facing downward, an outer wall downwardly extended from said shoulder and spaced around the periphery of said cylindrical body portion with a predetermined gap defined between said outer wall and said cylindrical body portion, a plurality of air inlets located on said outer wall, and a plurality of mounting lugs outwardly extended from a bottom edge of said outer wall below the elevation of said cylindrical body portion; and
    wherein said drainage device cover is mounted on said mounting plate of said drainage device and covered over said motor with said mounting lugs fastened to said mounting plate such that said cylindrical body portion has a bottom edge thereof isolated from said mounting plate, said air outlets face toward said exhaust fan, and the bottom edge of said outer wall is abutted against said top surface of said mounting plate.

2. The drainage device cover as claimed in claim 1, wherein said outer wall comprises at least one notch located on the bottom edge thereof.

3. The drainage device cover as claimed in claim 1, wherein a predetermined number of said mounting lugs are hook-shaped and hooked in respective hook holes in said mounting plate.

4. The drainage device cover as claimed in claim 1, wherein said mounting lugs are respectively fastened to said mounting plate with respective screws.

5. The drainage device cover as claimed in claim 1, wherein said cover body further comprises a plurality of ribs connected between said outer wall and said cylindrical body portion, said ribs being downwardly extended from said shoulder to the said bottom edge of said cylindrical body portion.

6. The drainage device cover as claimed in claim 5, wherein said ribs are integrally formed with said cylindrical body portion and said outer wall in one piece.

7. The drainage device cover as claimed in claim 1, wherein said air inlets are elongated holes arranged in an array.

* * * * *